United States Patent [19]

Nimerick

[11] Patent Number: 5,972,850
[45] Date of Patent: *Oct. 26, 1999

[54] METAL ION CROSSLINKED FRACTURING FLUID AND METHOD

[75] Inventor: Kenneth H. Nimerick, Tulsa, Okla.

[73] Assignee: Schlumberger Technology Corporation

[ * ] Notice: This patent issued on a continued prosecution application filed under 37 CFR 1.53(d), and is subject to the twenty year patent term provisions of 35 U.S.C. 154(a)(2).

[21] Appl. No.: 08/606,466

[22] Filed: Mar. 4, 1996

Related U.S. Application Data

[62] Division of application No. 08/283,129, Jul. 29, 1994, Pat. No. 5,681,796.

[51] Int. Cl.⁶ .............................. C09K 3/00; E21B 43/17
[52] U.S. Cl. ..................... 507/211; 507/213; 507/273; 166/308; 166/300
[58] Field of Search ................................. 507/211, 213, 507/273; 166/308

[56] References Cited

U.S. PATENT DOCUMENTS

| | | |
|---|---|---|
| 3,215,634 | 11/1965 | Walker .................................... 252/311 |
| 3,740,360 | 6/1973 | Nimerick . |
| 3,766,984 | 10/1973 | Nimerick . |
| 3,974,077 | 8/1976 | Free . |
| 4,033,415 | 7/1977 | Holtmyer et al. . |
| 4,514,309 | 4/1985 | Wadhwa . |
| 4,579,670 | 4/1986 | Payne . |
| 4,619,776 | 10/1986 | Mondshine ............................. 507/211 |
| 4,624,868 | 11/1986 | Muller . |
| 5,082,579 | 1/1992 | Dawson . |
| 5,160,445 | 11/1992 | Sharif . |
| 5,211,859 | 5/1993 | Horton et al. . |
| 5,252,234 | 10/1993 | Sharif .................................... 507/241 |
| 5,252,235 | 10/1993 | Sharif .................................... 507/241 |
| 5,252,236 | 10/1993 | Sharif .................................... 507/241 |
| 5,266,224 | 11/1993 | Sharif .................................... 507/241 |
| 5,271,466 | 12/1993 | Harms . |
| 5,372,732 | 12/1994 | Harris et al. .......................... 507/217 |

*Primary Examiner*—C H Kelly
*Attorney, Agent, or Firm*—John E. Vick, Jr.; Douglas Y'Barbo

[57] ABSTRACT

The invention, in one embodiment, is a novel fracturing fluid composition comprising an aqueous metal hydrated galactomannan gum, buffered to a pH of from about 9 to about 11. In another embodiment, a method of fracturing a formation is disclosed, the method being characterized by the use of the compositions mentioned.

42 Claims, No Drawings

METAL ION CROSSLINKED FRACTURING FLUID AND METHOD

This application is a Divisional of Ser. No. 08/283,129 filed Jul. 29, 1994, now U.S. Pat. No. 5,681,796.

This invention relates to the recovery of hydrocarbon fluids from subterranean formations. More particularly, the invention relates to a novel well treatment fluid, a process for its preparation, and to a method of treating or fracturing a subterranean formation using such fluid.

BACKGROUND OF THE INVENTION

In the process of recovering hydrocarbon values from subterranean formations, it is common practice to treat a hydrocarbon-bearing formation with a pressurized fluid to provide flow channels, i.e., to fracture the formation, or to use such fluids to control sand to facilitate flow of the hydrocarbons to the wellbore. Well treatment fluids, particularly those used in fracturing, typically comprise a water or oil based fluid incorporating a thickening agent, normally a polymeric material. The thickening agent helps to control leak-off of the fluid into the formation, and aids in the transfer of hydraulic fracturing pressure to the rock surfaces. Primarily, however, the thickening agent permits the suspension and transfer into the formation of proppant materials which remain in the fracture or sand when the hydraulic pressure is released, thereby holding the fracture open or stabilizing the sand.

Typical polymeric thickening agents for use in such fluids comprise galactomannan gums, such as guar and substituted guars such as hydroxypropyl guar and carboxymethylhydroxypropyl guar. Cellulosic polymers such as hydroxyethyl cellulose may be used, as well as synthetic polymers such as polyacrylamide. To increase the viscosity, and, therefore, the proppant carrying ability of the fracturing fluid, as well as increase its high temperature stability, crosslinking of the polymeric materials employed is also commonly practiced. Typical cross linking agents comprise soluble boron, zirconium, and titanium compounds.

By necessity, well treatment fluids are prepared on the surface, and then pumped through tubing in the wellbore to the hydrocarbon-bearing subterranean formation. While high viscosity, thickened fluid is highly desirable within the formation in order to transfer hydraulic pressure efficiently to the rock and to reduce fluid leak-off, large amounts of energy are required to pump such fluids through the tubing into the formation. To reduce the amount of energy required, various methods of delaying crosslinking have been developed. These techniques allow the pumping of a relatively less viscous fluid having relatively low friction pressures within the well tubing with crosslinking being effected near or in the formation so that the advantageous properties of thickened crosslinked fluid are available at the rock face.

One typical delayed crosslinking well treatment fluid system comprises borate crosslinked galactomannan gums such as guar or hydroxypropyl guar. The galactomannan polymers, which may be provided as a solid or as a suspension in a hydrocarbon, hydrate in neutral or acidic solution to form a gel. Under these conditions, i.e., pH of 7 or lower, no crosslinking of guar or hydroxypropyl guar will occur with borate ion. To effect borate crosslinking of guar and hydroxypropyl guar, the pH must be raised to at least 9.0. The requirement to raise the pH to this level has been exploited to delay the crosslinking of the galactomannan gums by borate ion.

The practice of delaying crosslinking of thickening agents in such fluids, however, presents its own set of difficulties. Thus, sophisticated techniques must be employed to adjust the pH of the fluid at the proper location, i.e., in or near the formation. U.S. Pat. No. 5,259,455, for example, describes the practice of controlled dissolution of MgO in a fracturing fluid to provide such pH adjustment. To be able to operate effectively where formation temperatures are above 200° F., the patent discloses additives to prevent the magnesium precipitation which would lower the pH of the system.

An alternative approach to downhole pH adjustment would be some reduction of the concentration of the thickening agent in the well treatment fluid, with crosslinking being accomplished or being only slightly delayed, the reduced loading thereby reducing the friction penalty. However, reduction of the thickening agent concentration (i.e., use of a lower concentration) in such fluids has not been practiced to any significant extent because of a long-established belief by those skilled in the art that minimum levels of loading of the thickening agents mentioned are required for effective or sufficient crosslinking. In the case of guar, for example, this concentration has been considered to be about 17 pounds of guar per one thousand gallons of aqueous fracturing fluid. This belief was based on studies of the radius of gyration of the guar molecule and the theory that if the radius of gyration of two molecules in solution do not overlap, the molecules cannot be crosslinked to produce the type of gel required for reliable fracturing operations. As a general proposition, most well treatment solutions employed in the field utilizing crosslinking of the thickening agent prior to the invention have utilized concentrations of the delayed crosslinking thickening agents that are well above the level mentioned, and, typically, 30 pounds per 1000 gallons of liquid or greater are used.

Accordingly, a need has existed for a well treatment fluid, especially a fracturing fluid, that exhibits relatively low friction loss in the well tubing, while avoiding the difficulties associated with raising the pH at the proper time or location, and further avoids those difficulties associated with insufficient crosslinking. Further, there has existed a need for an effective fluid having reduced concentrations of thickening agent or agents, thereby reducing the costs of such solutions and improving the conductivity of the formations. Finally, there has existed a need for a method of treating or fracturing a subterranean formation characterized by use of a low cost fracturing fluid that is not dependent on precision pH adjustment downhole. The invention addresses these needs.

SUMMARY OF THE INVENTION

Surprisingly, it has been found that the hydrated galactomannan gum component of a low or reduced concentration hydrated galactomannan gum containing fluid may be crosslinked by a suitable metal crosslinking agent if appropriate buffering of the fluid is provided. Moreover, it has been found that buffered, low concentration hydrated metal crosslinked galactomannan gum thickened fluids according to the invention are effective well treatment fluids that are easily transported down well with significant energy saving. Accordingly, in one embodiment, the invention relates to a novel well treatment fluid composition comprising an aqueous hydrated metal crosslinked galactomannan gum solution buffered to a pH of from about 9.0 to about 12, preferably from about 9.5 to about 11.75. More particularly, the invention relates to a well treatment fluid of the galactomannan gum type which is buffered by the addition of or which contains a selected buffering agent or agents in a concentration sufficient to provide or maintain a pH in the solution or fluid of from about 9.0 to about 12. In a preferred embodiment, the invention relates to a well treatment or fracturing fluid of the type described wherein the buffering agent comprises a weak acid and an ammonium or alkali metal salt of a weak acid, the acid and salt being selected to provide a pH of the fluid between 9.0 and 11. In a most preferred embodiment, the invention relates to a fracturing fluid composition comprising an aqueous hydrated borate crosslinked galactomannan gum solution containing a buffering agent, the buffering agent being present in the solution in an amount sufficient to provide the fluid with a pH of from about 9.0 to about 12. As used herein, the term "well treatment" refers generally to operations undertaken with respect to a well and formation, including, but not limited to, fracturing and sand control, while the term "galactomannan gum" is understood to include mixtures of such gums.

In a further embodiment of the invention, the invention relates to a method of treating a subterranean formation penetrated by a borehole, comprising injecting into the borehole and into contact with the formation, at a rate and pressure sufficient to treat the formation, a fluid composition comprising an aqueous hydrated metal crosslinked galactomannan gum solution buffered to a pH of from about 9.0 to about 12. Preferably, the fluid is injected at a pressure sufficient to fracture the formation. More particularly, the invention relates to a method of treating or fracturing characterized by use of a fluid of the galactomannan gum type wherein the buffering agent comprises a weak acid and an ammonium or alkali metal salt of a weak acid, the acid and salt being selected to provide a pH of the fluid of solution between about 9.0 and about 12. In a preferred embodiment, the galactomannan gum is borate crosslinked, and buffering agent is present in the solution in an amount sufficient to provide or maintain the fluid with a pH of from about 9.0 to about 12.

Finally, the invention relates to a process for preparing a fluid of the type described. According to this embodiment of the invention, galactomannan gum is dissolved or suspended in a neutral or acidic aqueous solution to form hydrated galactomannan gum. A crosslinking metal releasing agent and a buffering agent or agents, in a concentration sufficient to provide or maintain a pH in the solution or fluid of from about 9.0 to about 12, are then combined with the hydrated gum, simultaneously, or in any order, to form an aqueous hydrated metal crosslinked galactomannan gum solution buffered to a pH of from about 9.0 to about 12. As used herein, the term "crosslinking metal releasing agent" is taken to designate those metal or metal containing materials which will provide a metal ion or metal containing species in the solution capable of crosslinking the galactomannan gum. Temperatures employed are ambient or greater.

DETAILED DESCRIPTION OF THE INVENTION

As indicated, the fluid compositions of the invention comprise an aqueous hydrated metal crosslinked galactomannan gum solution. Preferred solutions are those derived from guar, hydroxypropyl guar, or carboxymethylhydroxypropyl guar, and mixtures thereof. Initially, the hydrated metal gum solutions may be formed by providing the gum compositions in solid powder form, or as a suspension in a hydrocarbon liquid (e.g., diesel or kerosene) and blending with a neutral or acidic aqueous solution, the hydrate forming a gel. As indicated, it is a surprising advantage of the invention that reduced concentrations of the hydrated crosslinked gum may be employed in the fluid. Preferably, the concentrations of the hydrated metal crosslinked gum will be below 25 pounds per 1000 gallons, being most preferably from about 10 pounds to 25 pounds per 1000 gallons, it being understood that higher amounts may be employed. Superior advantages accrue at levels of from 10 to 22 pounds per 1000 gallons of fluid.

Any suitable crosslinking metal ion, metal containing species, or mixture of such ions and species may be employed. Accordingly, as used herein, the term "metal crosslinked" is understood to include crosslinking attributable to certain metal containing species, such as borate ion. The crosslinking ions or species may be provided, as indicated, by dissolving into the solution compounds containing the appropriate metals, or by other means. Exemplary metal ions or metal containing species include those of boron, zirconium, and titanium, supplied from compounds such as boric acid, sodium borates, boron oxide, zirconium oxide, and titanium oxide. The concentration of added crosslinking metal releasing agent is dependent on factors such as the temperature and the amount of thickening agent employed, and will normally range from about 5 ppm to about 100 ppm, preferably from about 10 ppm to about 60 ppm . It is an important advantage of the invention that higher levels of the crosslinking metal ion or metal containing species may be employed, thereby insuring improved crosslinking. While cross-linking may be virtually immediate, a slight delay thereof, e.g., up to twenty seconds or so, may actually be preferred in the field since it allows mixing and pumping of the precursor solution through surface equipment, formation of the composition being feasible on the fly. Of course, persons of skill in the art would readily recognize that this invention may be employed using conventionally known polyol stabilizers, encapsulated crosslinkers, or timed released borate sources.

Any buffering agent or combination of such that will provide or maintain the solution at the necessary pH required may be employed. Thus, the combination of a weak acid and its salts may be employed, so long as the pH of the solution is maintained in the range mentioned. For example, the corresponding acid and ammonium and alkali metal phosphates, carbonates, bicarbonates, sesquicarbonates, acetates, or mixtures thereof may be used. Ammonium, potassium, and sodium carbonates, bicarbonates, sesquicarbonates and hydrogen phosphates are preferred as buffer salt components. For pH values toward the upper end of the range specified, combinations of alkali metal hydroxide and appropriate weak acid salt may be employed. For example, a buffer comprising a base such as NaOH or IOH and a weak acid salt such as $NA_2H_2PO_4$ may be used. Proportioning of the buffer components of the combinations to achieve the desired pH is well within the ambit of those skilled in the art. As will be appreciated by those skilled in the art, other additives commonly employed in fracturing solutions, such as breakers, clays, etc., must be selected so that they do not significantly reduce the pH of the solution. As indicated, the pH required in the various embodiments of the invention ranges from about 9.0 to 11, preferably from about 9.5 to about 10. The amount of buffer required is, of course, an effective amount, i.e., an amount sufficient to maintain the desired pH, given the additives and other components of the fluid. Preferably, this amount will not exceed 50 pounds per 1000 gallons of fluid, most preferably, not more than about 20 pounds per 1000 gallons of fluid.

In order to illustrate the invention more fully, the following procedures were performed.

Base fluids comprising fifteen pounds and twenty pounds of guar respectively per 1000 gallons of fresh water, optionally containing KCI or similar salt, were prepared, and the guar in each was allowed to hydrate. The fluids also contained minor amounts of normal, non-active (from the standpoint of crosslinking activity) fracturing fluid additives such as a surfactant, a biocide, and a defoamer. These fluids were used in the tests reported hereinafter. Sodium sesquicarbonate and sodium carbonate were added as a buffering agent to each base fluid in the amount of 12 pounds and 5 pounds, respectively, per 1000 gallons. Finally, boric acid, as a 3.5 percent by weight solution in water, based on the weight of the water and acid, was mixed with each of the base fluids containing the buffer to give a concentration-triton of 1.5 pounds of boric acid per 1000 gallons. Borate crosslinking of the guar was effected within 5 to 20 seconds.

To demonstrate the suitability of the fluids for fracturing, viscosity tests were performed. The conditions of and results of the tests are given in the tables below. Table I reports results with the 15 pound solution, while Table II reports results with the 20 pound solution. In both tables, viscosity results are rounded to the nearest 5th unit.

TABLE I

| | Viscosity, 100 sec$^{-1}$ (cp) | |
|---|---|---|
| Temperature | Initial | Final(3 hours) |
| 1) 100° F. | 135 | 120 |
| 2) 125° F. | 140 | 110 |
| 3) 150° F. | 140 | 105 |

TABLE II

| | Viscosity, 100 sec$^{-1}$ (cp) | |
|---|---|---|
| Temperature | Initial | Final(3 hours) |
| 1) 100° F. | 350 | 275 |
| 2) 125° F. | 370 | 255 |
| 3) 150° F. | 290 | 250 |
| 4) 175° F. | 285 | 180 |

As those skilled in the art will be aware, upon completion of fracturing, removal or breakdown of the fluid in the fracture is important, compositions called breakers (e.g., ammonium persulfate or peroxide) being employed to assist in such. The retained conductivity of the formation after such withdrawal and/or breakdown is an important measure of fracturing- fluid efficiency. Accordingly, standardized retained conductivity tests were run on two fluids according to the invention, utilizing a combination breaker system, the fluids containing 15 pounds (A) and 20 pounds (B), per 1000 gallons, respectively, of hydrated borate crosslinked galactomannan gum thickener. Each fluid was buffered with 12 pounds of sodium sesquicarbonate and 5 pounds of sodium carbonate. Proppant type was 20/40 Badger sand at a concentration of 2 lbs/sq.ft. A two percent by weight KCI solution was used as a base line solution. Results are shown in Table III.

TABLE III

| Fluid | Temp °F. | Breaker lbs/1000 gal. | Closure Pressure (psi) | Final Polymer Cone lbs/1000 gal | Conductivity (Darcy) | Percent Retained Conductivity |
|---|---|---|---|---|---|---|
| 2% KCI | 125 | 0 | 2000 | — | 216 | — |
| A | 125 | 2.5 (Tot.) | 2000 | 159 | 130 | 60 |
| B | 125 | 3.0 (Tot.) | 2000 | 188 | 106 | 49 |

Static fluid coefficients for fluids according to the invention were determined utilizing standard fluid loss coefficient procedures. Results are shown in Table IV.

TABLE IV

| Fluid (lbs/1000 gal) | Temp. °F. | Permeability (md) | Cw (ft/min$^{1/2}$) | Spurt (gal/100 ft$^2$) |
|---|---|---|---|---|
| 15 | 100 | 0.76 | 0.0017 | 1.82 |
| 15 | 125 | 0.77 | 0.0018 | 0.15 |
| 15 | 150 | 0.73 | 0.0023 | 5.17 |
| 20 | 100 | 0.77 | 0.0014 | 0.0 |
| 20 | 125 | 0.80 | 0.0016 | 0.0 |
| 20 | 150 | 0.71 | 0.0013 | 0.0 |
| 20 | 175 | 0.80 | 0.0032 | 0.0 |

These results clearly demonstrate the suitability of the low concentration borate crosslinked guar solution, buffered according to the invention, for use as a fracturing fluid.

In the manner described, supra, a fracturing fluid was prepared containing, per 1000 gallons, 10 pounds of guar, 1.5 pounds of boric acid, and 5 pounds each of sodium bicarbonate and sodium carbonate. Viscosity of solution at 90 oF was 170 sec$^{-1}$ with greater than 100 cp. This further experiment demonstrates the ability of the borate-buffer combination to crosslink very reduced concentrations of galactomannan gum.

What is claimed is:

1. A well treating fluid formed by combining, in any order:
   (a) an aqueous hydrated gum;
   (b) a buffering agent in an amount sufficient to provide a controlled alkaline pH, of between 9 and 11 the buffering agent being effective at the crosslinking pH of the fluid;
   (c) a metal ion source capable of furnishing metal ions in solution for crosslinking said gum;
   (d) the well treating fluid having reduced concentration levels of gum of about 10 to about 32 pounds of gum per 1000 gallons of well treating fluid;
   (e) wherein the fluid is effective to delay release of metal ions and facilitates a sufficiently elevated concentration of metal ions at the crosslinking pH to facilitate effective use of the fluid at subterranean temperatures.

2. The fluid of claim 1 wherein the metal ion source comprises a metal ion selected from the group consisting of: boron, zirconium, and titanium.

3. The fluid of claim 1 wherein the buffering agent is selected from one of the following: ammonium carbonates, potassium carbonates, sodium carbonates, bicarbonates, sesquicarbonates, and phosphates.

4. The fluid of claim 1 wherein the buffering agent is a boron-containing compound.

5. The fluid of claim 4 wherein the buffering agent is borax.

6. A process of fracturing a subterranean formation using an alkaline aqueous hydrated galactomannan gum-containing fluid having reduced concentration levels of galactomannan gum, the fluid being capable of achieving sufficient crosslinking to develop the rheology required to effectively carry proppant into a fracture, comprising the steps of:
   (a) forming an aqueous hydrated galactomannan gum solution having reduced concentrations of galactomannan gum, the concentration of galactomannan gum being the minimum amount which will adequately crosslink and achieve sufficient rheology, the concentration being less than about 30 lbs of galactomannan gum per 1000 gallons of fluid;

(b) combining with said galactomannan gum solution a metal releasing agent to form a combined fracturing fluid, further wherein the combined fracturing fluid is buffered using a buffer system in equilibrium at an alkaline pH of between 9 and 11 which is effective at the crosslinking pH of the metal releasing agent, further wherein the buffer system effectively resists pH changes as a function of increasing temperature;

(c) providing a propping agent;

(d) pumping the combined fracturing fluid and the propping agent downhole in concentrations effective to provide an alkaline pH during pumping; and (e) facilitating the reaction of said metal releasing agent with said galactomannan gum to provide a crosslinked galactomannan gum in the formation.

7. The process of claim 6 further wherein the buffering is accomplished using a boron-containing compound.

8. The process of claim 7 further wherein the crosslinking metal releasing agent buffers the fracturing fluid.

9. The process of claim 8 wherein the buffer is a boron-containing compound.

10. The process of claim 8 wherein the buffer is borax.

11. The process of claim 6 wherein the galactomannan gum is at a level of no greater than about 25 pounds per 1000 gallons of fluid.

12. The process of claim 6 wherein crosslinking is minimized during the earliest phase of the pumping of the fluid to the subterranean formation, and the fluid is effective to crosslink the galactomannan gum at bottomhole temperatures of up to and including about 250° F.

13. A process of fracturing a subterranean formation using a fluid having an alkaline pH, of between 9 and 11 comprising:

(a) forming an aqueous hydrated galactomannan gum solution;

(b) combining with said galactomannan gum solution a crosslinking metal releasing agent and a buffering agent to form a combined fracturing fluid; said buffering agent comprising at least one member selected from ammonium, potassium, and sodium carbonates, bicarbonates, sesquicarbonates, and hydrogen phosphates, further wherein said crosslinking metal releasing agent is a timed release borate source;

(c) providing a propping agent;

(d) pumping said combined fracturing fluid and said propping agent downhole in concentrations of less than 20–30 lb. guar/gallon of fluid, sufficient to provide an alkaline pH;

(e) allowing said metal releasing agent to react with said galactomannan gum at controlled rates to provide a crosslinked galactomannan gum in the formation;

(f) wherein the crosslinking of galactomannan gum is delayed during transit of the fluid to the subterranean formation, the fluid being effective to crosslink the galactomannan gum at bottomhole temperatures of between 175 and 250° F.

14. A well treating composition fluid, comprising:

(a) an aqueous hydrated galactomannan gum;

(b) a buffering agent effective to provide alkaline buffering at the effective crosslinking pH of the fluid, the buffering agent comprising a weak acid and a salt of said weak acid, in an amount sufficient to provide a controlled alkaline pH of from about 9 to about 11 in the fluid, the buffering agent being effective to resist undesirable pH fluctuations as the temperature of the fluid increases;

(c) a metal ion source capable of furnishing metal ions in solution for crosslinking said galactomannan gum;

(d) the well treating fluid being effective to crosslink and maintain fluid viscosity at reduced concentration levels of galactomannan gum comprising from about 10 to about 30 pounds of aqueous hydrated galactomannan gum per 1000 gallons of fluid;

(e) further wherein the fluid is effective to delay release of metal ions while facilitating a sufficiently elevated concentration level of metal ions to allow the effective use of the fluid.

15. The fluid of claim 14 wherein the metal ion source comprises a metal ion slurry, the metal ion further being selected from the group consisting of boron, zirconium, and titanium.

16. The fluid of claim 14 wherein the buffering agent comprises a weak acid and a salt of the weak acid, wherein the salt of the weak acid is selected from the group consisting of ammonium carbonates, potassium carbonates, sodium carbonates, bicarbonates, sesquicarbonates and hydrogen phosphates.

17. The fluid of claim 15 wherein the metal ion source comprises a boron-containing compound.

18. The fluid of claim 17 wherein the metal ion is a slowly soluble borate salt.

19. A process of fracturing a subterranean formation penetrated by a borehole, comprising injecting into the borehole and into contact with the formation, at a rate and pressure sufficient to fracture the formation, an alkaline fracturing fluid comprising from about 10 to about 30 pounds of aqueous hydrated metal crosslinked galactomannan gum per 1000 gallons of said fluid, buffered to a pH of from about 9 to about 11, said buffering occurring in the alkaline pH range of the effective crosslink pH of the fracturing fluid, whereby the use of said amounts of galactomannan gum is achieved in part by controlling fluid pH at the effective crosslink pH of the fluid.

20. A process of fracturing a subterranean formation penetrated by a borehole, comprising injecting into the borehole and into contact with the formation, at a rate and pressure sufficient to fracture the formation, an alkaline fracturing fluid composition comprising:

(a) an aqueous hydrated galactomannan rum;

(b) a buffering agent effective to provide alkaline pH buffering at the effective crosslinking pH, the buffering agent comprising a weak acid and a salt of said weak acid, in an amount sufficient to provide a pH of from about 9 to about 11 in the fluid, wherein the buffering agent is capable of effectively resisting pH changes as a function of temperature;

(c) a slurry capable of furnishing metal ions in solution for crosslinking said galactomannan gum; and (d) the well treating fluid being effective at reduced concentration levels of galactomannan of comprising from about 10 to about 25 pounds of aqueous hydrated galactomannan gum per 1000 gallons of fluid;

(e) the fluid being effective to delay release of metal ions while facilitating a sufficiently elevated concentration level of metal ions.

21. A process of fracturing a subterranean formation, comprising:

(a) forming an aqueous hydrated galactomannan gum solution of more than about 30 pounds of galactomannan gum per 1000 gallons of solution;

(b) combining with said galactomannan gum solution a crosslinking metal releasing agent and a buffering agent to form a combined fracturing fluid, said buffering agent being alkaline and also effective at the crosslinking pH to resist pH changes in the fluid due to presence of acid or base, the buffering agent comprising at least one member selected from ammonium, potassium, and sodium carbonates, bicarbonates, sesquicarbonates, and hydrogen phosphates, further wherein the buffering agent contains approximately equimolar amounts of acid and salt;

(c) providing a propping agent;

(d) pumping said combined fracturing fluid and said propping agent downhole in concentrations sufficient to provide an alkaline pH during pumping of from about 9 to about 11: and (e) allowing said metal releasing agent to react with said galactomannan gum at controlled rates to provide a crosslinked galactomannan mum in the formation.

22. The process of claim 21 further wherein the metal releasing agent comprises a timed released borate source that increases the borate ion availability for crosslinking the galactomannan mum over a period of time, further wherein a portion of the borate source is masked during the earliest phase of the pumping step.

23. The process of claim 22 further wherein the borate source is comprised of a borate selected from the croup comprising alkaline earth metal salt borate compounds.

24. The process of claim 21 wherein the galactomannan gum loading is at a level of about 10 to 24 pounds of guar per 1000 gallons of fluid.

25. The process of claim 24 wherein the crosslinking is minimized during the earliest phase of the pumping of the fluid to the subterranean formation, and the fluid is effective to crosslink the galactomannan gum and resist undesirable pH changes at bottomhole temperatures of between 175 and 250° F.

26. A process of fracturing a subterranean formation, comprising:

(a) forming an aqueous hydrated galactomannan solution;

(b) combining with said galactomannan gum solution a crosslinking metal releasing agent and a buffering agent operating in the alkaline pH range, the buffering agent being effective at the crosslinking pH of the fluid, thereby forming a combined fracturing fluid; said buffering agent comprising at least one member selected from ammonium, potassium, and sodium carbonates, bicarbonates, sesquicarbonates, and hydrogen phosphates, further wherein said crosslinking metal releasing agent-is a timed release borate source;

(c) providing a propping agent;

(d) pumping said combined fracturing fluid and said propping agent downhole in concentrations of about 10 to 30 lb. guar/gallon of fluid, sufficient to provide an alkaline pH of from about 9 to about 11;

(e) allowing said metal releasing agent to react with said galactomannan gum at controlled rates to provide a crosslinked galactomannan gum in the formation;

(f) wherein the crosslinking of galactomannan gum is delayed during the transit of the fluid to the subterranean formation.

27. The process of claim 26 wherein the buffering agent comprises a buffer ion pair, the buffer ion pair comprised of a weak acid and a salt of a weak acid, further wherein the weak acid and salt of the weak acid are present in approximately comparable molar ratios to facilitate pH control against undesirable pH reductions in the fluid downhole.

28. A well treating composition fluid, comprising:

(a) an aqueous hydrated galactomannan gum;

(b) a buffering agent effective to provide alkaline buffering at the effective crosslinking pH of the fluid, the buffering agent comprising a weak acid and a salt of said weak acid, the weak acid and salt of said weak acid present in amounts that are effective, on a molar basis, to establish a buffer equilibrium in the fluid, further wherein the buffering agent is present in an amount sufficient to provide a controlled alkaline pH of from about 9 to about 11 in the fluid;

(c) a borate ion source capable of furnishing borate ions in solution for crosslinking said galactomannan gum;

(d) the well treating fluid being effective to crosslink and maintain fluid viscosity at reduced concentration levels of galactomannan gum comprising from about 10 to about 24 pounds of aqueous hydrated galactomannan gum per 1000 gallons of fluid;

(e) further wherein the fluid is effective to delay release of borate ions while facilitating a sufficiently elevated concentration level of borate ions during crosslinking.

29. The well treating fluid of claim 28 wherein at least one component of the buffering agent is selected from ammonium, potassium, and sodium carbonates, bicarbonates, sesquicarbonates, and hydrogen phosphates.

30. The fluid of claim 28 in which the buffering agent is formed by adding sodium sesquicarbonate and sodium carbonate in ratios between about 3:1 and 1:3.

31. The fluid of claim 28 in which the buffering agent is formed by adding sodium bicarbonate and sodium carbonate in ratios between about 1:2 and 2:1, further wherein the total added sodium carbonate and sodium bicarbonate, combined, is at least 8 lbs/1000gallons and bottom hole temperature is at least 140 degrees F.

32. The fluid of claim 28 in which the buffering agent is formed by adding sodium sesquicarbonate and sodium carbonate, where the combined added amount of sodium carbonate and sodium sesquicarbonate is at least about 9 lbs/1000 gallons, the buffering agent being effective to resist pH changes as the temperature of the fluid increases to temperatures above about 130 degrees F.

33. The fluid of claim 28 in which the buffering agent is formed by adding sodium bicarbonate and sodium carbonate in approximately comparable molar ratios.

34. The fluid of claim 28 in which the buffering agent is formed by adding sodium sesquicarbonate and sodium carbonate in ratios of about 12:5.

35. The fluid of claim 28 in which the buffering agent is formed by adding sodium bicarbonate and sodium carbonate in ratios of about 1:1.

36. A process of fracturing a subterranean formation penetrated by a borehole, comprising infecting into the borehole and into contact with the formation, at a rate and pressure sufficient to fracture the formation, an alkaline fracturing fluid composition comprising:

(a) an aqueous hydrated galactomannan gum;

(b) a buffering agent effective to provide alkaline pH buffering at the effective crosslinking pH, the buffering agent being capable of resisting pH changes effectively as a function of increasing temperature to maintain fluid viscosity, the buffering agent formed from addition to the fluid of sesquicarbonate or sodium carbonate, whereby equilibrium between carbonic acid and its salts is facilitated in the fluid, the buffering agent being present in an amount sufficient to provide a pH of from about 9 to about 11 in the fluid;

(c) a slurry capable of furnishing borate ions in solution for crosslinking said galactomannan gum;

(d) the well treating fluid being effective at reduced concentration levels of galactomannan gum comprising about 15–25 pounds of aqueous hydrated galactomannan gum per 1000 gallons of fluid.

37. The process of claim 36 further wherein the galactomannan gum loading is about 20 lbs/1000 gallons, the fluid viscosity achieved by the fluid after about three hours at 100 degrees F. is at least about 275 $sec^{-1}$ (cp).

38. The process of claim 36 further wherein the galactomannan gum loading is about 20 lbs/1000 gallons, the fluid viscosity achieved by the fluid after about three hours at 125 degrees F. is at least about 255 $sec^{-1}$ (cp).

39. The process of claim 36 further wherein the galactomannan gum loading is about 20 lbs/1000 gallons, the fluid viscosity achieved by the fluid after about three hours at 150 degrees F. being at least about 250 $sec^{-1}$ (cp).

40. The process of claim 36 further wherein the galactomannan gum loading is about 20 lbs/1000 gallons, the fluid viscosity achieved by the fluid after about three hours at 175 degrees F. being at least about 180 $sec^{-1}$(cp).

41. A method of fracturing a subterranean formation penetrated by a borehole, comprising injecting into the borehole and into contact with the formation, at a rate and pressure sufficient to fracture the formation, a fracturing fluid comprising from about 10 to about 25 pounds of aqueous hydrated metal crosslinked galactomannan gum per 1000 gallons of said fluid, buffered to a pH of from about 9.0 to about 12.

42. A method of fracturing a subterranean formation penetrated by a borehole, comprising injecting into the borehole and into contact with the formation, at a rate and pressure sufficient to fracture the formation, a fracturing fluid composition comprising an aqueous hydrated metal crosslinked galactomannan gum fluid having no more than about 30 pounds of gum per 1000 gallons of fluid and a buffering agent comprising at least one member selected from ammonium, potassium, and sodium carbonates, bicarbonates, sesquicarbonates, and hydrogen phosphates, in an amount sufficient to provide a pH of from 9.0 to 12 in the fluid.

* * * * *